(12) United States Patent
Procida

(10) Patent No.: US 7,645,386 B2
(45) Date of Patent: Jan. 12, 2010

(54) METHOD OF PRODUCING PURE HALIDE SALTS OF ALKALINE AND/OR ALKALINE EARTH METAL RESULTING FROM HYDROLYTIC TREATMENT OF HALOGENOUS ORGANIC WASTE MATERIAL

(76) Inventor: Jan Procida, Holmegardsvej 2, 3th, Charlottenlund (DK) DK-2990

( * ) Notice: Subject to any disclaimer, the term of this patent is extended or adjusted under 35 U.S.C. 154(b) by 768 days.

(21) Appl. No.: 11/404,868

(22) Filed: Apr. 17, 2006

(65) Prior Publication Data

US 2006/0231493 A1    Oct. 19, 2006

(30) Foreign Application Priority Data

Apr. 18, 2005    (DK) ............... 2005 00556

(51) Int. Cl.
*B01D 61/00* (2006.01)
*A62D 3/36* (2007.01)

(52) U.S. Cl. ............... 210/652; 210/170; 210/723; 210/639; 588/316; 203/14

(58) Field of Classification Search ......... 210/652, 210/170, 639, 723; 588/316; 203/14
See application file for complete search history.

(56) References Cited

U.S. PATENT DOCUMENTS

| | | | |
|---|---|---|---|
| 3,826,789 A | | 7/1974 | Yokokawa |
| 3,953,570 A | | 4/1976 | Müller et al. |
| 4,155,819 A | | 5/1979 | Carlin |
| 4,331,525 A | * | 5/1982 | Huba et al. ......... 210/650 |
| 4,783,270 A | | 11/1988 | Murao et al. |
| 5,518,633 A | | 5/1996 | Brown et al. |
| 6,124,518 A | * | 9/2000 | Rasmussen ......... 588/316 |
| 6,274,050 B1 | * | 8/2001 | Rasmussen ......... 210/758 |
| 6,465,707 B1 | * | 10/2002 | Procida ......... 588/316 |
| 6,608,136 B1 | * | 8/2003 | Dean et al. ......... 524/505 |
| 2004/0136889 A1 | | 7/2004 | Bonath et al. |

FOREIGN PATENT DOCUMENTS

| | | |
|---|---|---|
| DE | 257 822 A1 | 6/1988 |
| DE | 43 18 875 A1 | 12/1994 |
| DE | 19932955 | 7/1999 |
| EP | 1 117 463 B1 | 7/2001 |
| EP | 1 188 717 A1 | 3/2002 |
| EP | 1 202 931 B1 | 5/2002 |
| NO | 29439 | 2/1919 |
| NO | 30905 | 7/1920 |

* cited by examiner

*Primary Examiner*—Ana M Fortuna
(74) *Attorney, Agent, or Firm*—Oblon, Spivak, McClelland, Maier & Neustadt, L.L.P.

(57) ABSTRACT

Pure halogen salts of alkaline and/or alkaline earth metals or a mixture thereof are prepared by
  (I) hydrolytically heating a suspension of 1 part by weight of a halogenic, organic waste material in a comminuted state in 1-10 parts by weight of an aqueous medium in the presence of a base to a temperature ranging from 200-300° C. at a pressure sufficient to maintain the water in a liquid state for a period of time sufficient to convert substantially all the organically bound halogen present to inorganic halides, and
  (II) separating the hydrolysate obtained in step (I) into a solid hydrolysate fraction and a liquid hydrolysate fraction,
  (III) neutralizing the liquid hydrolysate with hydrohalogenic acid,
  (IV) adding a flocculent to the neutralized hydrolysate;
  (V) separating the material from step (IV) into a solid containing fraction and an aqueous solution; and
  (VI) nanofiltering the aqueous solution to obtain a retentate and a permeate, wherein the permeate is further treated to obtain the pure salts.

16 Claims, 2 Drawing Sheets

METHOD OF PRODUCING PURE HALIDE SALTS OF ALKALINE AND/OR ALKALINE EARTH METAL RESULTING FROM HYDROLYTIC TREATMENT OF HALOGENOUS ORGANIC WASTE MATERIAL

TECHNICAL FIELD

The present invention relates to a method of producing pure halogen salts of alkaline and/or alkaline earth metals or a mixture thereof from a liquid hydrolysate fraction resulting from a treatment of halogenous, organic waste material to decompose said halogenous, organic waste material comprising the steps of (I) hydrolytic heating a suspension of 1 part by weight of the waste material in comminuted state in 1-10 parts by weight of an aqueous medium in the presence of a base to a temperature between 200-300° C., preferably 250-280° C., at a pressure sufficient to maintain the water in liquid state for a period of time sufficient to convert substantially all the organically bound halogen present to inorganic halides, and (II) separation of the hydrolysate obtained in step (I) into a solid hydrolysate fraction and a liquid hydrolysate fraction.

BACKGROUND ART

EP 1 117 463 discloses a method of treating halogenous, organic waste material. The halogenous, organic waste material is decomposed by means of hydrolytic heating of a suspension of the waste material in comminuted state in an aqueous medium in the presence of a base such as alkaline and/or alkaline earth metal hydroxide at a temperature of between 250 and 280° C. at a pressure sufficient to keep the water in a liquid state, in a period of time sufficient to convert substantially all organically bound halogen present into inorganic halides. The aqueous medium used in the hydrolysis has a water content ensuring that a sufficient portion of the base present and all of the halide salts obtained are in solution during the entire process of hydrolysis. After the hydrolytic decomposition the hydrolysate obtained is separated into a solid phase and a liquid phase, thereafter the solid phase is treated in a post-heating liberating recyclable organic compounds having a melting point below room temperature and a boiling point above room temperature.

The liquid phase of the hydrolysate includes various alcohols which may be evaporated, isolated and exploited. This leaves behind a solid-containing residue including calcium sulphate and other inorganic materials containing alkali and/or alkali earth halide, alkali and/or alkali earth hydroxide and compounds containing heavy metals. At the further treatment according to EP 1 117 463 the remainder is washed with water and filtrated. The filtrate is directed to a system for precipitation of heavy metals in which the heavy metals, being dissolved as salts, are precipitated by means of e.g. NaS or NaOH or in a corresponding conventional manner. After precipitation the industrial waste water used may be directed on to a biologic sewage treatment works, or it may be directed back in the process.

The liquid phase of the hydrolysate typically includes approx. 2.1 meq/liter (mol equivalents/liter) of alkaline and/or alkaline earth metal halide. When exemplified by a chlorine containing waste treated with NaOH as the base this corresponds to approx. 11% by weight of sodium chloride. After the above treatment the halide salt will be present in the process water and is emitted into nature sooner or later. Although, in areas with access to emission into the sea or similar salt water reservoirs, environmentally such an emission into nature is justifiable when diluted sufficiently with additional water, the emission and disposal of industrial waste water containing halide salt may be problematic in areas far from major salt water areas. Furthermore it is unsatisfactory that halide salts, being a valuable resource, are not exploited.

Thus in general it can be noted that the halogenous content of the treated organic waste according to EP 1 117 463 is converted in an advantageous manner into a aqueous solution of halide salts which, after biological purification, e.g. may be emitted into the sea without environmental hazards per se.

Nevertheless emission of the purified halide salt solution is to be considered less desirable as:

The biological purification implies a major dilution of the halide solution, and thus occupies a considerable capacity of the sewage treatment plant.

Emission is not always possible or permitted from recycling plants far from the sea.

The halide solution represents a resource which may be the basis of commercial recovery of halide salts.

Processing and recycling of halide salts may be effected in a conventional process by means of multi-stage evaporation in vacuo. Obtaining a well-crystallising halide salt product, however, implies a high degree of purity with regard to certain critical components. For instance, traces of lead, typically found in PVC waste and thus also in the resulting halide solution, are absorbed quantitatively in the obtained salt and cause deformed crystals. Moreover lead is undesirable in salt in a number of applications.

It has now appeared that by means of a relatively simple treatment of the liquid phase or fraction of the hydrolysate, said fraction may be purified for obtaining a pure salt product in the form of a usable resource material. Thus a pure salt product meeting the requirements for the application as a road salt or a "vacuum salt" may be obtained from a hydrolysate containing a chloride salt such as calcium or sodium chloride originating from the treatment of pure PVC waste. At the treatment of electronics scrap the hydrolysate includes a mix of halides. In this case pure mixtures of the halide salts such as $CaF_2$, $CaCl_2$ and $CaBr_2$ and/or NaF, NaCl and NaBr can be obtained by means of the treatment. As industrially pure salts, NaF is used at a considerable scale for the fluoration of drinking water while NaBr is applied in an aqueous solution as balance liquid used at oil and gas wells, and as a biocide. Furthermore both salts are fine chemicals in a number of different connections. A mix of pure halide salts with $CaBr_2$ and/or NaBr being the main components, as it is obtained by means of the treatment of electronics scrap, may replace $CaBr_2$ and/or NaBr as a balance liquid in the oil industry. Mixtures of $CaCl_2$ and NaCl are especially usable as road salt.

BRIEF DESCRIPTION OF THE INVENTION

The present invention relates to a method of producing pure halogen salts of alkaline and/or alkaline earth metals or a mixture thereof from a liquid hydrolysate fraction resulting from the above type of treatment to decompose halogenous, organic waste material as disclosed in EP 1 117 463, characterized in, that the liquid hydrolysate fraction is further subjected to step a) neutralization with hydrohalogenic acid, step b) addition of a flocculent, step c) separation of the material from step b) into a solid containing fraction, such as a filter cake or a suspension, and an aqueous solution, step d) nanofiltration of the aqueous solution to obtain a retentate and a permeate, where after the permeate is treated in a per se known manner for obtaining the pure salts.

The hydrohalogenic acid may be applied as a solution of the hydrogen halide or may be added as a gas containing hydrogen halide.

The separation in step c) may be effected by means of centrifugation or filtration, preferably by centrifugation.

The nanofiltration in step d) may be effected in a single step or include two or more nanofiltration steps coupled in a series so that the permeate from a previous step is conducted to a subsequent step as the feeding material thereto. The retentate or the retentates from the nanofiltration in step d) may be recycled back to the separation in step c).

The method according to the invention makes it possible to obtain the halide salt or salts contained in the liquid hydrolysate fraction in a surprisingly pure form. Thus the content of Pb is reduced substantially. This is e.g. seen at the crystallisation of NaCl, at which even small amounts, such as 20-40 ppm Pb, prevent the formation of ordinary cubic NaCl crystals. The production of sodium halide in crystalline form is carried out in a per se conventional manner by evaporation of the permeate or the final permeate from the nanofiltration process in step d), preferably in vacuo.

The method according to the invention may be applied with advantage in connection with the method of treatment of halogenous, organic waste material of the type described in EP 1 117 463. By such treatment the halogenous, organic waste material is subjected to:

(I) hydrolytic heating of a suspension of 1 part by weight of the comminuted waste material in 1-10 parts by weight of a aqueous medium in the presence of a base to a temperature at between 200 and 300° C., typically between 250 and 280° C. by means of a pressure sufficient to keep the water in a liquid state, at a period of time sufficient to convert substantially all organically bound halogen present into inorganic halides, and (II) separation of the hydrolysate obtained in step (I) into a solid phase and a liquid phase.

The solid phase obtained in step (II) may be exploited as a fuel or may be post-heated as proposed in EP 1 117 463 to obtain valuable organic compounds. In both cases it is important for the exploitation that the solid phase is substantially free of halogens.

Thus after the hydrolytic decomposition the halogens originally being present in the halogenous, organic waste material will be present in the liquid hydrolysate phase obtained in the above step (II). From this liquid hydrolysate phase the alkaline and/or earth alkaline halide salts are obtained in a pure form by the present invention.

Thus, the method according to the invention is based on the liquid hydrolysate fraction generated as the liquid phase in the above step (II). In one embodiment wherein the solid hydrolysate phase from step (II) is to be subjected to a post-heating as disclosed in EP 1 117 463 the solid-containing fraction in step c) of the method according to the present invention may advantageously be directed back to the post-heating together with the solid phase of the hydrolysate. In this way the heavy metals and other inorganic compounds are combined in the residue from the post-heating.

Alternatively the solid containing fraction from in step c) may advantageously be concentrated for the winning of heavy metals provided that the content of heavy metals is sufficiently high.

The extent of the applicability of the invention appears from the below detailed description. It is to be understood, however, that the detailed description and the specific examples are only provided as an illustration, as they state the preferred embodiments of the invention as, on the basis of the detailed description, various amendments and modifications within the scope of the invention will be obvious for persons skilled in the art.

DESCRIPTION OF THE DRAWING

In FIG. 1 the below guiding codes are used:

Figure 1:
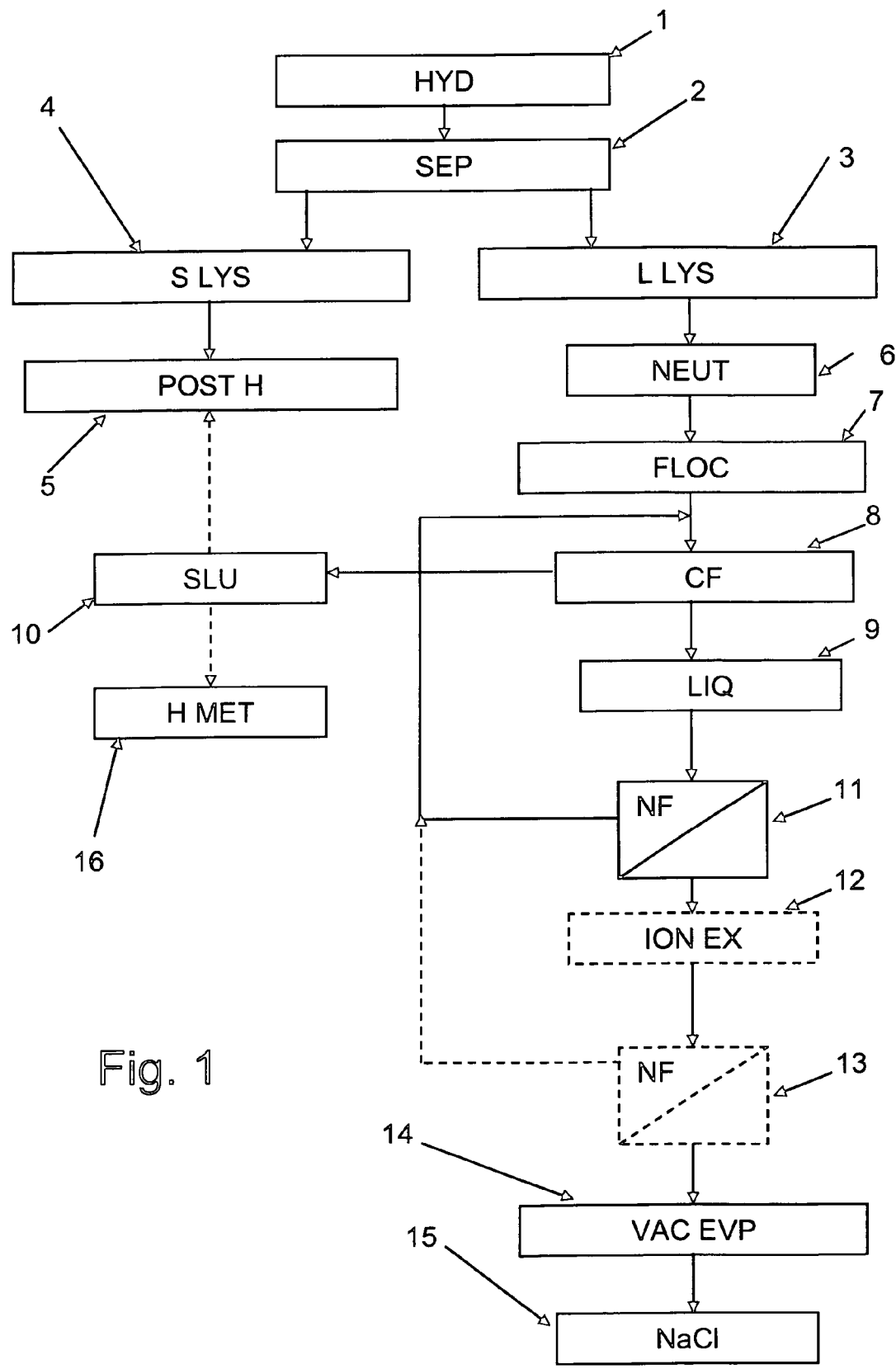
FIG. 1 is a flow chart showing a preferred embodiment of the method according to the invention applied in connection with a process of hydrolysis according to EP 1 117 463 in which the halogenous, organic waste material is PVC and the base is NaOH.

| Code | Meaning | Reference Numeral |
| --- | --- | --- |
| HYD | Hydrolysis | 1 |
| SEP | Separation | 2 |
| S LYS | Solid hydrolysate phase | 3 |
| L LYS | Liquid hydrolysate phase | 4 |
| POST H | Post-heating | 5 |
| NEUT | Neutralisation | 6 |
| FLOC | Flocculent | 7 |
| CF | Centrifugal separator | 8 |
| LIQ | Liquid | 9 |
| SLU | Suspension | 10 |
| NF | Nanofiltration | 11, 13 |
| ION EX | Ion exchange | 12 |
| VAC EVP | Vacuum evaporation | 14 |
| H MET | Heavy metals | 16 |

DETAILED DESCRIPTION OF THE INVENTION

During the development of the present invention it has become apparent that it is possible to recycle halide salts at a commercially interesting purity by means of a combination of nanofiltration in one or more steps and a subsequent vacuum evaporation. The nanofiltration has been optimised by means of a preceding adjustment of the pH of the solution to fixed values, whereby a considerable part of the remaining inorganic and organic compounds are prepicitated and may be separated by means of conventional methods prior to subjecting the lucid liquid to nanofiltration.

The combination of nanofiltration and vacuum evaporation has shown to be particularly suitable for winning technically pure halide salts from a solution of alkali and/or alkali earth metal halides which are obtained after the hydrolysis of PVC waste and other halogenous, organic compounds and polymers. By optimising the "cut-off value", i.e. the smallest size expressed in Dalton of the ions or molecules which are held back by the nanofiltration membranes, not only heavy metals such as lead are removed but also large and relatively non-volatile organic molecules such as phthalic acid and long-chained alcohols are removed while alkali and/or alkali earth metal halides quantitatively pass the membrane without any substantial osmotic effect. The small amounts of water-soluble organic compounds passing the membrane together with alkali and/or alkali earth metal halides are low-molecular and relatively volatile, and are easily removed together with the water vapour on vacuum evaporation.

FIG. 1 shows a preferred embodiment of the invention according to which the PVC waste is treated by means of hydrolysis 1; according to EP 1 117 463 this is effected by means of hydrolytic heating of a suspension of 1 part by weight of the PVC waste in a comminuted state in 1-10 parts by weight of an aqueous medium in the presence of NaOH as the base to a temperature at between 250 and 280° C. by means of a pressure sufficient to keep the water in a liquid state, at a period of time sufficient to convert substantially all organically bound halogen present into inorganic halides, i.e. inorganic chlorides in the case of PVC waste material.

The obtained hydrolysate is subjected to a separation 2, whereby it is divided into a liquid hydrolysate phase 3 and a solid hydrolysate phase 4. In the present embodiment the latter is subjected to a post-heating 5 according to the above mentioned EP publication. Alternatively, depending on the economy, the solid hydrolysate phase could be utilized as a fuel.

The liquid hydrolysate phase 3, containing NaCl and a excess of NaOH, is subjected to a neutralisation 6 by means of adding HCl to a neutral pH value, thereafter a flocculent 7 is added. Subsequently a separation is carried out by means of a centrifugal separator 8 according to the embodiment shown. Hereby a clear liquid 9 and a suspension 10 including heavy metals are obtained. Together with the solid hydrolysate phase 4 the suspension may be subjected to post-heating 5 and subsequent treatment as described in EP 1 117 463. If the content of heavy metals 16 is sufficiently high, said heavy metals may be winned from the suspension 10.

Subsequently the liquid 9 from the centrifugal separator 8 is nanofiltered on a nanofilter 11 where the liquid is separated into a retentate and a permeate. The permeate, containing a large amount of sodium halide, here exemplified by NaCl in solution, is subsequently treated in a conventional way for preparation of the pure salt by means of stepwise vacuum evaporation 14 thus obtaining pure NaCl 15. In certain cases the permeate from the nanofiltration is treated by ion exchange 12. Alternatively or in addition one or more additional treatments may be carried out upon nanofiltration 13 prior to vacuum evaporation 14. The retentate from the nanofiltration 11 and the possible retentate or retentates from additional nanofiltrations 13 may advantageously be recycled back to the entry side of the centrifugal separator 8.

At an alternative embodiment filtration is used instead of centrifugation 8.

The method according to the embodiment is based on the above method of hydrolytic decomposition of halogenous, organic waste material described in EP 1 117 463, according to which a solid hydrolysate fraction and a liquid hydrolysate fraction respectively are obtained after hydrolysis. In the embodiment wherein NaOH is used as the base by the hydrolytic treatment the liquid hydrolysate fraction typically contains 1.7-2.4 mol/liter of sodium halide, especially 2.0-2.2 mol/liter such as 2.1 mol/liter, together with excess of NaOH and has a pH value of typically 7-9. If the waste material is PVC waste, the sodium halide is solely sodium chloride and the amounts stated in mol/liter (in case of NaCl=meq/liter) correspond to 9-13% by weight, especially 10.5-11.5% by weight, such as approximately 11% by weight, NaCl. If the halogenous, organic waste material treated contains halides other than sodium chloride, the total content of sodium halides in the liquid hydrolysate fraction is of the same order of magnitude calculated in meq/liter.

The method according to the invention may also be applied for obtaining pure NaCl, NaF and/or NaBr resulting from other corresponding hydrolysis treatments in an alkaline environment of halogenous, organic waste material, especially PVC, where the halide content of the waste material is converted into inorganic halide.

When the base used in the hydrolytic treatment of the halogenous, organic waste material is a combination of calcium hydroxide and/or calcium carbonate and sodium hydroxide and the waste material is PVC the resulting salts can be a mixture of calcium chloride and sodium chloride valuable as a road salt.

In case of bromine containing waste the obtained calcium and/or sodium bromide salts represent a promising source of bromine. Thus if the dried salt obtained by the present method has a high content of bromides recycling as a bromine gas for the production of brominated plastics can be contemplated.

In this connection is noted that the currently bromine is obtained from the Dead Sea having a relatively high content of bromides together with other salts. The present invention contemplates a useful alternative source to that of the Dead Sea salt.

In addition to alkali and/or alkali earth metal halide and excess of alkali and/or alkali earth metal hydroxide, present in solution, the liquid hydrolysate fraction typically contains compounds of silicon, phosphorus, aluminium, lead, iron, antimony, copper, tin and zinc as well as small amounts of manganese, titanium, calcium and arsenic in a dissolved or colloidal disperse condition (100-1000 Å or 0.01-0.1 µm).

The liquid hydrolysate fraction requires an acid to be neutralised to a neutral pH value, such as 6.5-7.5, especially 6.8-7.2. Preferably a hydrohalogenic acid providing the same halide ions as those already found in the liquid hydrolysate fraction is used as an acid. In practice HCl especially is used. Hereby the excess of alkali and/or alkali earth metal hydroxide is converted into the alkali and/or alkali earth metal halide desired. Usually the acid is added as an aqueous solution, but hydrogen halide may also be added as a gas, whereby the acid is generated in the aqueous environment. Theoretically another acid may be used for the neutralisation provided that no undesirable anions are generated.

After neutralisation a conventional flocculent (flocculation agent) is added, preferably an anionic flocculent. MAGNAFLOC® 1011 by Ciba Specialty Chemicals Inc. Basle, Switzerland and flocculents by Ondeo Nalco Europe BV, Leiden, Netherlands, e.g. NALCO® 71099 are examples of applicable flocculents. Usually the flocculent is added at an mount of 1-6 kg per ton of dry matter, preferably 2-5 kg per ton of dry matter, most preferably 2.5-4 kg per ton of dry matter. The amounts of flocculent may often be reduced by use of an elevated temperature, e.g. 30-50° C.

Subsequently the flocculents are separated from the alkali and/or alkali earth metal halide-containing solution by means of a conventional separation process known per se.

The separation may be effected by means of filtration on a filter having a pore size of 0.01-1.0 µm, preferably 0.08-0.5 µm, especially 0.1-0.3 µm. The filtration is effected in a conventional way, e.g. by means of a filter press or another known filtration technique.

In a preferred embodiment the separation is effected by means of centrifugation. By centrifugation the matter is separated into a heavy fraction with a dry matter content of 15-30% by weight, preferably 18-25% by weight, such as 20-22% by weight, and a light fraction containing 1.7-2.4 meq/liter, such as 2.1 meq/liter alkali and/or alkali earth metal halide in solution, in the case of NaCl approximately corresponding to 9-13% by weight, such as approx. 11% by weight.

The centrifugation may be carried out by means of a conventional centrifuging separator such as a decanter centrifuge. The DP/DT series by Hiller GmbH, D-84137 Vilsbiburg, Germany is an example of applicable decanter centrifuges. Typical speeds of rotation are from 2500 to 4000 rpm.

The weight ratio of the heavy fraction, i.e. the suspension, to the aqueous solution obtained as the light fraction (the centrate) is usually chosen at between 1:3 and 1:6, typically at between 1:3.5 and 1:4.5, such as approx. 1:4.

The filter cake from the filtration or the heavy fraction from the centrifugation, which is a thick suspension, each has a large or small content of heavy metals. The filter cake or the suspension may for example be combined with the solid hydrolysate fraction and be subjected to the post-heating described in EP 1 117 463. It is also possible to concentrate the filter cake or the suspension to obtain and isolate compounds containing heavy metals. In fact the content of metals, especially Pb, can be sufficiently high to make melting in a lead production plant profitable.

Subsequently the filtrate from the filtration or the light fraction (the centrate) from the centrifugation is treated by means of nanofiltration on a nanofilter with a molecular cutoff value at 100-600 Dalton, preferably 100-400, especially 150-300 Dalton, allowing for the passage of alkali and/or alkali earth metal ions and halide ions while keeping back large ions, non-dissociated salts as well as large molecules.

The nanofiltration may advantageously be carried out under cross flow conditions with a transmembrane pressure at 500-1500 KPa (5-15 bar), preferably 800-1200 KPa, at a temperature from room temperature up to 50° C., preferably 35-45° C.

The retentate from the nanofiltration may advantageously be directed back to the separation step (step c).

The permeate from the nanofiltration, still being a solution with a considerable content of alkali and/or alkali earth metal halide, may subsequently be purified to obtain the pure salt in a way, which, as far as sodium chloride is concerned, is a method used conventionally for the production of vacuum salt, e.g. by means of ion exchange and/or by one or more steps of nanofiltration and eventually evaporation in vacuo in one or usually more steps combined with separating the precipated salt crystals from the mother lye, e.g. on centrifugation, and is washed with clean water.

The salt obtained by the method according to the invention is of such purity that it may be used as road salt or electrolysis salt. In order to be applied as electrolysis salt the purity of the product is to meet the purity requirements for vacuum salt. A mixture of pure halide salts with $CaBr_2$ and/or NaBr being the main compounds, as obtained from treatment of electronics scrap, may replace $CaBr_2$ and/or NaBr as the balance liquid in the oil industry.

As industrially pure salts, NaF is used for the fluoridation of drinking water at considerable scale while $CaBr_2$ and/or NaBr are applied in an aqueous solution as a balance liquid used by processing in oil and gas wells, and as a biocide. Furthermore both salts are included as fine chemicals in a great number of different connections.

In a preferred embodiment the salt obtained by inventive method is NaCl.

According to another preferable embodiment the salt obtained by inventive method is a mixture mainly consisting of NaCl or $CaCl_2$ or a mixture mainly consisting of NaCl and $CaCl_2$. Such mixtures are for example usable as road salt.

According to yet another preferable embodiment the salt obtained by inventive method is a mixture mainly consisting of NaBr and/or $CaBr_2$. Such mixtures are usable as components in drilling mud and as resource for the preparation of bromine.

According to a further preferable embodiment the salt obtained by inventive method is a mixture mainly consisting NaF and/or CaF2. Such salt is for example usable for the fluoridation of drinking water.

In the present specification and claims the term "mainly consisting of" is intended to mean at least 50% by weight, preferably at least 75% by weight, more preferred at least 85% by weight and even more preferred at least 90% by weight.

EXAMPLES

Example 1

Comparison

Waste material from PVC cables was hydrolysed by means of the method described in EP 1 117 463 with NaOH as the base. The hydrolysate was left for sedimentation and a liquid hydrolysate fraction was separated from the precipitate by means of decantation. Said liquid hydrolysate fraction, having a dry matter content of approx. 0.5% by weight and a pH value of 11-12, was hereafter neutralised to pH 7-7.5 by adding HCl. The precipitate generated was removed by means of decantation.

The decantate was nanofiltered in order to obtain a retentate and a permeate in a DSS LabStak® M20 laboratory membrane test module by Danish Separation Systems A/S, Nakskov, Denmark, with a DK nanofiltration membrane of 0.072 $m^2$ and a molecular cut-off value at 150-300 Dalton by Osmonics, Inc., Minnetonka, Minn. 55343, USA. The work was carried out with a cross-flow (feeding at the retentate side) of 7 l/min, a transmembrane pressure at 1000 KPa (10 bar) at a temperature of approx. 40° C. resulting in a permeate flux of approx. 60 $l/m^2 \times h$ with a content of NaCl of the same magnitude as in the decantate added.

The dry salt crystals obtained from the permeate of the above example showed a rounded form. This irregular form of salt crystals is due to a high content of metals and is unsatisfactory.

Example 2

Waste material from PVC cables was hydrolysed by means of the method described in EP 1 117 463 with NaOH as the base. The hydrolysate was placed for sedimentation and a liquid hydrolysate fraction was separated from the precipitate by means of decantation. Said liquid hydrolysate fraction, having a dry matter content of approx. 0.5% by weight and a pH value of 11-12, was hereafter neutralised to pH 7-7.5 by adding HCl.

Subsequently the flocculent (MAGNAFLOC® 1011 by Ciba Specialty Chemicals Inc. Basel, Switzerland) was added at a quantity amounting to 4.6 kg per ton of dry matter. The centrifugation was carried out in a decanter centrifuge DP 45-422 by Hiller GmbH, D-84137 Vilsbiburg, Germany, at 3550 rpm. The feed velocity by the centrifugation was 7.0 $m^3/h$ with a dry matter content of 0.5% by weight, corresponding to a velocity of 35 kg/h calculated as dry matter, and the temperature was maintained at 13° C. The heavy fraction obtained was a sticky suspension with a content of dry matter of 17.74% by weight while the centrate was a clear solution. The analysis of the two fractions calculated on the content of dry matter appears from table 1.

TABLE 1

| | Centrifugation | |
|---|---|---|
| Element | Heavy fraction (suspension) mg/kg dry matter | Centrate mg/liter |
| Chlorine, total | 180,000 | 36,000 |
| Silicon | 1,700 | 2.72 |
| Manganese | 3 | 0.12 |
| Magnesium | <0.6 | 0.47 |
| Titanium | 16 | <0.02 |
| Phosphor | 200 | <1 |

TABLE 1-continued

Centrifugation

| Element | Heavy fraction (suspension) mg/kg dry matter | Centrate mg/liter |
|---|---|---|
| Sodium | 121,000 | 21,500 |
| Calcium | 40 | 2.8 |
| Aluminium | 179,000 | 0.21 |
| Lead | 51,724 | 0.946 |
| Iron | 270 | 2.87 |
| Cadmium | <0.4 | <0.001 |
| Barium | <10 | <0.01 |
| Antimony | 10,289 | 11.7 |
| Chromium | <1 | 0.02 |
| Copper | 144 | 0.126 |
| Tin | 1,120 | <0.2 |
| Zinc | 4,620 | 2.44 |
| Potassium | <100 | 34 |
| Mercury | 0.3 | <0.002 |
| Arsenic | 80 | 0.05 |

It appears from table 1 that the centrate has a remarkably low content of Pb (approx. 1 ppm) calculated as dry matter. The contents of Al (approx. 0.2 ppm) and Sb (approx. 12 ppm) also have low levels in the centrate. This clearly shows that the salt obtained by means of the inventive method has a substantially reduced content of metals (apart from sodium) and thus appears as a considerably improved product.

Example 3

Waste material from PVC cables was hydrolysed by means of the method described in EP 1 117 463 with NaOH as the base. The hydrolysate was left for sedimentation and a liquid hydrolysate fraction was separated from the precipitate by means of decantation. Said liquid hydrolysate fraction, having a dry matter content of approx. 0.5% by weight and a pH value of 11-12, was hereafter neutralised to pH 7-7.5 by adding HCl. Subsequently the flocculent (MAGNAFLOC® 1011 by Ciba Specialty Chemicals Inc. Basel, Switzerland) was added at a quantity amounting to 4.6 kg per ton of dry matter. Hereupon the material was filtered through a Büchner filter with an average pore size of 0.2 μm. The analysis of the filtrated material (the retentate) and the filtrate calculated on the content of dry matter appears from table 2.

TABLE 2

Filtration

| Element | Retentate mg/kg dry matter | Filtrate mg/liter |
|---|---|---|
| Chlorine, total | 219,000 | 67,500 |
| Silicon | 300 | 0.24 |
| Manganese | <0.6 | 0.004 |
| Magnesium | <0.6 | 0.07 |
| Titanium | 7 | <0.02 |
| Phosphor | <100 | <1 |
| Sodium | 164,000 | 62,800 |
| Calcium | 50 | 6.2 |
| Aluminium | 157,000 | 0.82 |
| Lead | 74 | 0.45 |
| Iron | 240 | 0.03 |
| Cadmium | <0.4 | 0.001 |
| Barium | 30 | 0.27 |
| Antimony | 226 | 7.9 |
| Chromium | 3 | 0.02 |
| Copper | <9 | 0.064 |
| Tin | 1,230 | <0.2 |
| Zinc | 1,950 | 0.15 |

TABLE 2-continued

Filtration

| Element | Retentate mg/kg dry matter | Filtrate mg/liter |
|---|---|---|
| Potassium | <100 | 96.8 |
| Mercury | 0.2 | <0.002 |
| Arsenic | 30 | 0.005 |

Example 4

A centrate obtained as described in the example 2 was nanofiltered subject to the same conditions as described in example 1. The results of the analysis of the permeate obtained (permeate 1) are shown in table 3. The permeate 1 is treated an additional 1 or 2 times by means of nanofiltration subject to conditions corresponding to conditions for obtaining permeate 2 and permeate 3 respectively. The results of the analysis hereof are shown in table 3 as well.

TABLE 3

| Unit | Permeate 1 mg/liter | Permeate 2 mg/liter | Permeate 3 mg/liter |
|---|---|---|---|
| Magnesium (Mg) | 0.097 | <0.002 | 0.015 |
| Manganese (Mn) | 0.066 | 0.006 | 0.046 |
| Sodium (Na) | 20800 | 19500 | 18700 |
| Calcium (Ca) | 1.2 | 0.5 | 0.7 |
| Aluminium (Al) | <0.03 | <0.03 | <0.03 |
| Lead (Pb) | 0.03 | <0.02 | <0.02 |
| Iron (Fe) | 0.436 | <0.004 | 0.303 |
| Cadmium (Cd) | 0.001 | <0.001 | <0.001 |
| Barium (Ba) | 0.010 | <0.002 | <0.002 |
| Antimony (Sb) | 1.09 | <0.02 | 0.30 |
| Chromium (Cr) | <0.008 | <0.008 | <0.008 |
| Copper (Cu) | <0.02 | <0.02 | <0.02 |
| Tin (Sn) | 0.025 | <0.006 | 0.014 |
| Potassium (K) | 21.2 | 26.5 | 21.7 |
| Nickel (Ni) | <0.03 | <0.03 | <0.03 |
| Silicon (Si) | 1.98 | 1.45 | 1.18 |
| Zinc (Zn) | 0.040 | <0.006 | <0.006 |
| Arsenic (As) | <0.002 | <0.002 | <0.002 |
| Mercury (Hg) | <0.001 | <0.001 | <0.001 |

The permeates 1, 2 and 3 were evaporated by means of three-stage-evaporation and crystallised in a pilot plant. The details appear from table 4.

TABLE 4

|  | Permeate 1 | Permeate 2 | Permeate 3 |
|---|---|---|---|
| pH of the initial solution | 7 | 7 | 7 |
| Evaporation temperature, °C. | 107 |  |  |
| Solubility at evaporation temperature, % | 28.4 |  |  |
| Solubility at room temperature, % | 26.4 |  |  |
| Amount of diluted salt water, g | 824 | 1033 | 1030 |
| Evaporated water until saturation, g | 656 | 843 | 849 |
| Saturated salt water, g | 168 | 190 | 181 |
| Salt in saturated salt water, g | 48 | 54 | 51 |
| Initial salt concentration, % by weight | 5.8 | 5.2 | 5.0 |
| Total evaporated amount of water at the end, g | 686 | 894 | 906 |
| Amount of dry salt produced, g | 11.9 | 20.2 | 22.6 |
| Concentration factor (KF) * | 7 | 9 | 10 |

* KF = Amount of diluted salt water/(Amount of diluted salt water − Total amount of evaporated water at the end − Amount of dry salt produced).

Figure 2:
FIG. 2 shows salt crystals produced by means of the method according to the invention at 84× magnification.

The dry salt crystals obtained from permeate 1 had an average particle size of approx. 400 µm. FIG. 2 shows a microscopic photography (magnification 84×) of the crystals obtained. It can be seen that the crystals have a cubic shape. Such an undisturbed cubic crystal shape can not be obtained in the presence of lead, even at small amounts at an order of 20-40 ppm Pb. On comparing the crystals obtained to the crystals obtained in the comparison example (example 1) it becomes obvious that quite a considerable improvement of the resulting salt product has been achieved.

Furthermore the example clearly shows that it is possible to obtain salt crystals with a satisfactorily low content of metals as early as after a single step of nanofiltration. In order to obtain further reduced amounts of specific metals it may, however, be desirable to carry out a plurality of steps of nanofiltration (cf. table 4).

From the description of the invention it is obvious that the invention may be varied in many ways. Such variations are not to be considered as deviations from the scope of the invention, and each and every of such modifications obvious for a person skilled in the art is also to be understood as being covered by the scope of the following claims.

The invention claimed is:

1. A method of producing pure halogen salts of alkaline and/or alkaline earth metals or a mixture thereof from a liquid hydrolysate fraction resulting from a treatment of halogenous, organic waste material to decompose said halogenous, organic waste material comprising the steps of
   (I) hydrolytically heating a suspension of 1 part by weight of a halogenic, organic waste material in a comminuted state in 1-10 parts by weight of an aqueous medium in the presence of a base to a temperature ranging from 200-300° C. at a pressure sufficient to maintain the water in a liquid state for a period of time sufficient to convert substantially all the organically bound halogen present to inorganic halides, and
   (II) separating the hydrolysate obtained in step (I) into a solid hydrolysate fraction and a liquid hydrolysate fraction,
   (III) neutralizing the liquid hydrolysate with hydrohalogenic acid,
   (IV) adding a flocculent to the neutralized hydrolysate;
   (V) separating the material from step (IV) into a solid containing fraction and an aqueous solution; and
   (VI) nanofiltering the aqueous solution to obtain a retentate and a permeate, wherein the permeate is further treated to obtain the pure salts.

2. The method according to claim 1, wherein step (V) is carried out by centrifugation.

3. The method according to claim 1, wherein step (V) is carried out by filtration.

4. The method according to claim 1, wherein step (VI) comprises two or more nanofiltration steps in series whereby the permeate from a first nanofiltration step is introduced as the feed material into the following step.

5. The method according to claim 4, wherein the retentate or retentates from nanofiltration step (VI) is/are recycled to the separation in step (V).

6. The method according to claim 4, wherein the permeate or the last permeate from the nanofiltration in step (VI) under vacuum and collecting is evaporated to obtain a crystallized salt.

7. The method according to claim 1, wherein the solid hydrolysate fraction obtained in step (II) and the solid containing fraction obtained in step (V) are combined and the combined fractions are post-heated to liberate organic compounds having a melting point below room temperature and a boiling point above room temperature.

8. The method according to claim 1, wherein the solid containing fraction obtained in step (V) is processed to obtain heavy metals.

9. The method according to claim 1, wherein the flocculent used in step (IV) is an anionic flocculent.

10. The method according to claim 1, wherein the nanofiltration in step (V) is conducted with nanofilters having a molecular cut-off value of 100-400 Dalton.

11. The method according to claim 10, wherein said nanofilters have a molecular cut-off value of 150-300 Dalton.

12. The method according to claim 1, wherein the nanofiltration in step (VI) is conducted with a trans membrane pressure of 500-1500 KPa.

13. The method according to claim 12, wherein said trans membrane pressure ranges from 800-1200 KPa.

14. The method according to claim 1, wherein the obtained salt is NaCl.

15. The method according to claim 1, wherein the obtained salt is a mixture mainly consisting of NaCl and $CaCl_2$.

16. The method according to claim 1, wherein the obtained salt is a mixture mainly consisting of NaBr and $CaBr_2$.

* * * * *